United States Patent
Birke et al.

(10) Patent No.: US 9,971,634 B2
(45) Date of Patent: May 15, 2018

(54) DETECTION OF RESOURCE CONTENTION ON COMPUTERIZED SYSTEMS USING CO-LOCATED COMPUTER PROCESSES SUCH AS VIRTUAL MACHINES

(71) Applicant: International Business Machines Corporation, Armonk, NY (US)

(72) Inventors: Robert Birke, Kilchberg (CH); Yiyu L. Chen, Thalwil (CH); Martin L. Schmatz, Rueschlikon (CH); Joel Vallone, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 14/866,191

(22) Filed: Sep. 25, 2015

(65) Prior Publication Data

US 2017/0090996 A1    Mar. 30, 2017

(51) Int. Cl.
| | |
|---|---|
| *G06F 9/455* | (2006.01) |
| *G06F 9/50* | (2006.01) |
| *G06F 9/52* | (2006.01) |
| *G06F 11/30* | (2006.01) |

(52) U.S. Cl.
CPC .......... *G06F 9/52* (2013.01); *G06F 9/45558* (2013.01); *G06F 9/5077* (2013.01); *G06F 11/30* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 2007/0136115 A1* | 6/2007 | Senturk Doganaksoy | G06F 17/18 705/35 |
| 2009/0177439 A1* | 7/2009 | Samples | G05B 23/024 702/179 |
| 2011/0238336 A1* | 9/2011 | Di Scalea | G01N 29/043 702/56 |
| 2016/0004863 A1* | 1/2016 | Lazri | G06F 9/45558 726/23 |

OTHER PUBLICATIONS

Jin et al. Characterizing Application Performance Sensitivity to Resource Contention in Multicore Architectures. [online] (2009). NAS., pp. 1-17. Retrieved From the Internet <https://www.researchgate.net/profile/Johnny_Chang/publication/228572903_Characterizing_application_performance_sensitivity_to_resource_contention_in_multicore_architecture>.*

* cited by examiner

*Primary Examiner* — Emerson C Puente
*Assistant Examiner* — Jonathan R Labud
(74) *Attorney, Agent, or Firm* — Scully, Scott, Murphy & Presser, P.C.; Daniel Morris, Esq.

(57) ABSTRACT

The present invention is notably directed to systems and methods for detecting resource contention on a computerized system collocation of computer processes. Most basically, such methods comprise: monitoring data produced by each computer process of a set of computer processes co-located on the computerized system; detecting in the monitored data a change in a behavior of data produced by a given computer process of the set of computer processes; and throttling other computer processes of the set than said given computer process to detect potential resource contention at said given computer process. Such systems and methods advantageously apply to co-located virtual machines.

14 Claims, 3 Drawing Sheets

US 9,971,634 B2

DETECTION OF RESOURCE CONTENTION ON COMPUTERIZED SYSTEMS USING CO-LOCATED COMPUTER PROCESSES SUCH AS VIRTUAL MACHINES

FIELD

The invention relates in general to the field of methods and systems for detecting resource contention on computerized systems that use collocation of computer processes. In particular, it is directed to the detection of resource contention on systems using co-located virtual machines.

BACKGROUND

Virtual machines (VM) collocation is massively used, e.g., in datacenters, to maximize computer utilization. However, the use of VM collocation causes conflicts in terms of resource sharing: shared physical resources become subject to contention, a phenomenon that can cause the quality of service to drop. It is therefore desired to detect potential contention in systems of co-located VMs. Essentially three types of approaches have been developed to address this issue.

A first type of contention detection is based on static signatures, whereby one tries to match given VM measures to manually defined behaviors.

A second type of detection uses VM cloning. In such solutions, investigations are started when neither historical data nor similar VM match a currently monitored VM behavior and one basically make a clone of a production VM, into isolation conditions. To reproduce similar client input, the network input traffic is copied and forwarded to both the production VM and the clone. Contention is then diagnosed if behavioral differences are found between the isolated clone and the production VM.

A third approach is to avoid contention, using prior and on-line characterization. Namely, a pressure test is applied on the VM to be scheduled/re-scheduled on a dedicated test machine. Then, the datacenter scheduler is made aware of VMs sensitivity and impact on shared resources. Whenever the VM performances deviates from the system's predictions, the pressure test is re-run.

SUMMARY

According to a first aspect, the present invention is embodied as a method for detecting resource contention on a computerized system that uses collocation of computer processes. Basically, the method comprises: monitoring data produced by each computer process of a set of computer processes co-located on the computerized system; detecting in the monitored data a change in a behavior of data produced by a given computer process of the set of computer processes; and throttling other computer processes of the set than said given computer process to detect potential resource contention at said given computer process.

According to another aspect, the invention is embodied as a computerized system using collocation of computer processes, whereby of a set of computer processes are co-located on the computerized system, the system comprising: one or more processing units; and a memory comprising computerized methods, the latter configured, upon execution by the one or more processing units, for implementing steps of monitoring, detecting and throttling, such as described above, to detect potential resource contention.

According to a final aspect, the invention is embodied as a computer program product, comprising a computer readable storage medium having program instructions embodied therewith, the program instructions executable to cause to implement steps of the method described above.

The above method, system and computer program product advantageously find applications to systems using virtual machines collocation.

Systems, methods and other computerized implementations embodying the present invention will now be described, by way of non-limiting examples, and in reference to the accompanying drawings.

BRIEF DESCRIPTION OF SEVERAL VIEWS OF THE DRAWINGS

FIGS. 3-6 show graphs that schematically clusters of data, consisting of: "normal" data produced by a given computer process, e.g., a virtual machine, statistical outliers data produced by said given process, and isolated data produced by the same computer process when throttling neighboring processes, the axes representing two different metrics.

DETAILED DESCRIPTION OF EMBODIMENTS OF THE INVENTION

Figure 1:
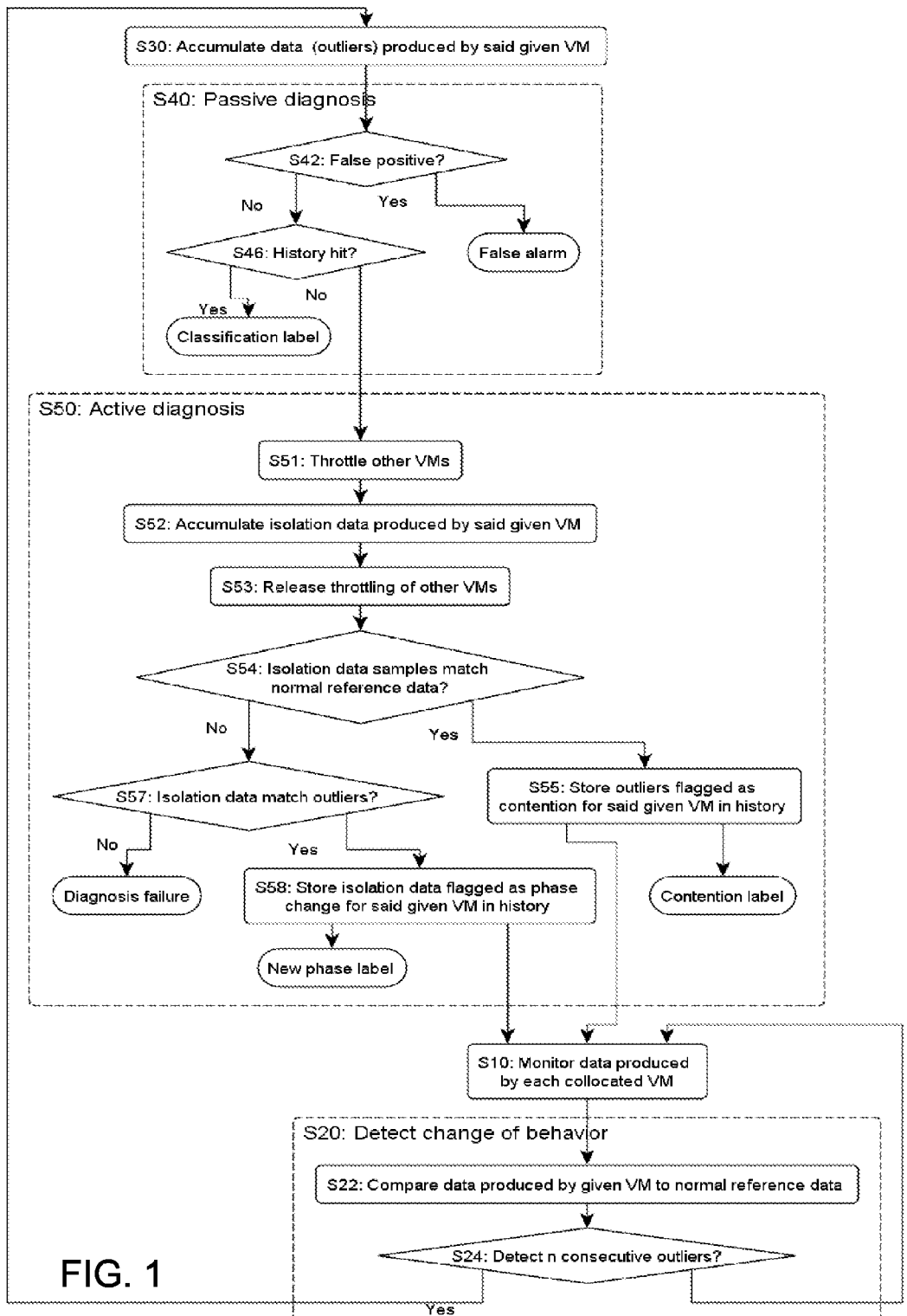
FIG. 1 is a flowchart illustrating high-level steps of a method for detecting resource contention on a computerized system that uses virtual machines collocation, according to embodiments.

Referring generally to FIGS. 1-7, an aspect of the invention is first described, which concerns methods for detecting resource contention on a system that uses collocation of computer processes. I.e., computer processes such as virtual machines 200 are co-located on this system 100 (see FIGS. 2 and 7), meaning that the processes share same resources from the system, a thing that can lead to contention, as noted earlier.

The present methods revolve around the following basic steps. First, data produced by each computer process 200 are monitored, step S10, FIG. 1. Second, whenever a change is detected in the behavior of the data produced by a given process (step S20, FIG. 1), other computer processes are throttled S51. Throttling other processes makes it possible to isolate said given process and obtain data produced in isolation, which eventually allows to detect S55 potential resource contention at this process.

A computer process may be a job, a task or a thread. A task may for instance itself comprise one or more units of execution of a job, consistently with terminologies used in batch processing computer systems. A task may itself be referred to as a process or a thread, e.g., in the documentation accompanying some operating systems. A job typically means any process which can be broken up into tasks that are necessary to carry out for the job to complete. Thus, generally, a computer process as defined herein may comprise one or more units of execution, e.g., of a job or a task. In addition, computer processes as contemplated herein may encompass virtual machines, or VMs, it being noted that a VM can be regarded as an organized collection of units of execution of a job or a task. Therefore, present methods advantageously find application to detection of resource contention on computerized systems using VM collocation. For completeness, application of the present concepts may further take place in the context of operating-system-level virtualization and software containers, e.g., where applications are deployed inside software containers.

In the following, VMs are assumed, in place of computer processes, for the sake of illustration and without prejudice as to the scope of the present embodiments. When applied to co-located VMs, the present methods basically revolve around the following steps. First, one monitors S10 data produced by each VM 200 co-located on the system. I.e., data produced by each VM are independently monitored for each VM. Then, if, in the monitored data, a change is detected in the behavior of data produced by a given VM, the other VMs are throttled S51, to be able to detect S55 potential resource contention at said given VM.

That the VMs are co-located means that they share same resources from the system, as noted above. Typically, the VMs are located on a same physical machine, or host. One or more applications or, more generally, any type of computer program instructions, may run on the VMs.

Thanks to the above scheme, when a behavioral change in the data production of a given VM is detected, an active diagnosis can be performed, i.e., by throttling neighboring VMs, to detect a possible resource contention at said given VM.

In detail, resource contention refers to conflicting access or usage of some shared resource and performance degradation that occurs when the VM virtual machines compete for such shared resources. Contention as contemplated herein notably encompasses memory contention (e.g., in particular the last level of cache or CPU cache) or input/output (I/O) resource contention. I/O contention refers to performance degradations that occur when virtual machines compete for I/O resources. I/O contentions mostly occur in case of large workloads, e.g., when frequent reads and writes occur, a thing that may cause latency and bottlenecks. Typically, the more virtual machines in an environment, the higher the risk for resource contention.

More generally though, resource contention as meant herein may concern: compute resources (e.g., CPU time, GPU time), memory hierarchy (involving any level of CPU cache, main memory and auxiliary memory) and Network devices. I/O contention may notably refer to contention related to disks or system buses.

The throttling mechanism evoked herein can be understood as a mechanism that restricts or possibly shuts down completely activities of the neighboring VMs, and this, sufficiently enough to obtain isolation conditions for the presumed contention victim. Isolation conditions are assumed to be achieved when one can reasonably expect that an isolated VM does cannot suffer from residual activities of the other VMs the contenders. These conditions depend on the system implementing the VMs (or more generally the computer processes). It is therefore not necessarily needed to completely shut down the other, co-located VMs.

The present systems and methods allows for detecting resource contention, even in new situations not encountered so far, i.e., where passive diagnosis methods (which uses history data) would fail. Still, the present methods can advantageously interlace active diagnosis (throttling) with passive diagnosis (where historical data are used). Combining passive and active diagnoses, one may detect behavior changes and contention, and then classify the behavioral changes detected, so as to alleviate the need for subsequent active throttling. Such embodiments are discussed later in detail.

In addition, embodiments of the present invention have the following advantages:
  They make it possible to maintain customer confidentiality (VMs are considered as black boxes);
  They are generic, i.e., the same approach can be used to detect contention for each of the VMs; and
  They are automated and allow fast reaction, inasmuch as VMs are constantly on-line monitored.

Referring now more specifically to FIG. 1, embodiments of the present methods are now discussed in more details. The flowchart of FIG. 1 shows three main sections, respectively directed to: (i) the detection phase (S20); (ii) a passive diagnosis (S40), which advantageously complement (iii) the active diagnosis (S50). According to this flowchart and as discussed above, whenever a change is detected, S20, in the behavior of data produced by a given VM, attempt is made to first passively diagnose the origin of the change, step S40. If the change cannot be satisfactorily diagnosed according to the passive analysis, then one proceeds to an active diagnosis, step S50, by throttling the other VMs S51, so to be able to detect S55 potential resource contention.

Figure 3:
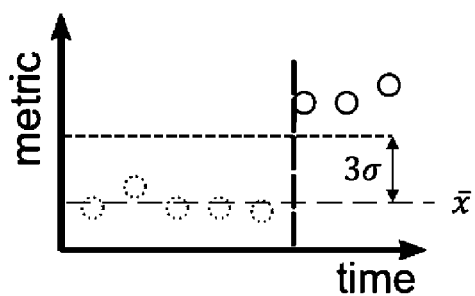
FIG. 3 is a graph that schematically illustrates how statistical outliers can be detected, using a suited metric vs. time, as involved in embodiments.

In detail, the process may start with monitoring S10 data produced by each VM of the set of VMs co-located on the system, so that each VM is independently monitored. Then, if a change occurs in the behavior of the data produced by a given VM, the change shall be detected at step S20. To that aim, one may simply compare S22 data produced by VMs to normal reference data, e.g., obtained for each of the VMs. The comparison and monitoring steps may involve any suitable metric, as discussed later. The detection may use any suitable statistical tools, e.g., moving average and standard deviation of the monitored data in a sliding temporal window. As illustrated in FIG. 3, a change may be detected, for a given VM, when data starts to depart from recent average data obtained for that same VM. In the example of FIG. 3, a change is detected when data monitored depart from more than three time the standard deviation obtained in the temporal window. A change in the behavior of the monitored data may for instance be assumed to be detected if n consecutive statistical outliers are detected S24 in said temporal window, where typically $n \geq 2$ or 3, so as to allow for a fast reaction. In variants, one may even consider that a behavioral change already takes place when only one statistical outlier is detected, to allow for even faster reaction. Monitoring is preferably constantly maintained and so step S24 loops back to step 10.

If a change is detected, S20, in the behavior of data produced by a given VM, data (outliers) produced by the given VM may be accumulated, S30, in order to facilitate subsequent comparisons.

Figure 4:
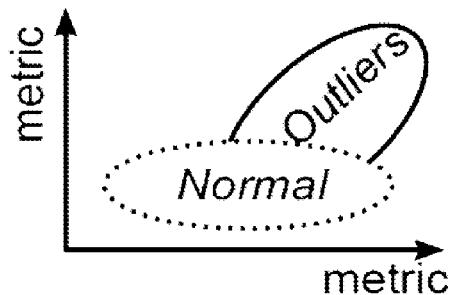

The present methods preferably first try to establish S40 a passive diagnosis. The passive diagnosis may first comprise a step of checking false positives S42. The false positive check may act as a filtering step to confirm the behavior change with respect to latest normal data observed. It may specifically check that a non-negligible fraction of the outlier data form a cluster that differs from a latest normal data cluster observed, as illustrated in FIG. 4. If a false positive is detected, a corresponding flag may be output and the passive diagnosis ends. Else, the outliers (i.e., the data accumulated at S30 for the given VM) may be compared to historical data previously obtained for that same VM, step S46. If a match is found, a corresponding flag is returned and the passive diagnosis ends.

If, on the contrary, the passive diagnosis is inconclusive as to a potential resource contention (or phase change, as discussed below) at said given VM (i.e., the recently observed outliers do not match any historic data), then the process moves on to the active diagnosis, step S50.

As touched earlier, the active diagnosis involves throttling S51 the other VMs of the set, which results in isolating the given VM. Monitoring behavior changes and the passive diagnosis can be run in parallel for each VM. However, the active diagnosis (throttling) corresponds to a serialization point, i.e., only one VM can be actively diagnosed at a time.

For a given change detected in respect of a given VM, present methods preferably accumulate S52 isolated data produced by said given VM when throttling the other VMs. Once enough isolated date have been accumulated, one may release S53 throttling of the other VMs, as there is no need to maintain the throttling any longer at this point.

Next, the isolated data can be compared S54 to reference data. The reference data considered are preferably data that were previously obtained for the same given VM. For "normal" reference data, one may consider, independently of time, one or more other datasets considered as normal. However, the reference data used are partitioned per VMs. The "outlier" data are however unique in the sense that these are data that were observed right after the behavior changed (S20).

Note that the data accumulated are typically sample units, that is, measurements. Several sample units are typically accumulated to build a statistical sample and the present comparisons are preferably performed based on statistical samples.

Figure 5:
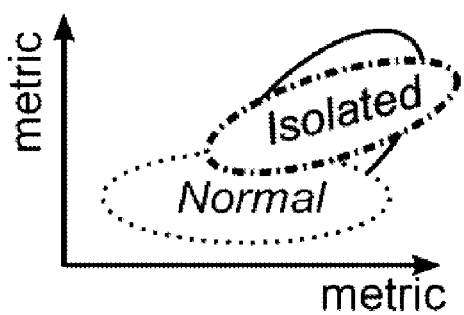
Figure 6:
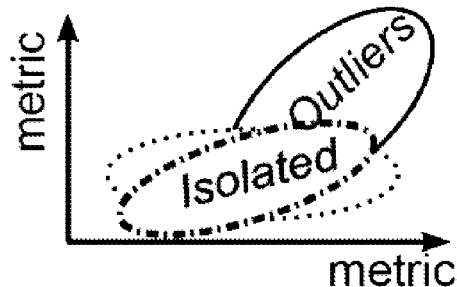

As illustrated in FIGS. 5, 6, the isolated data may be compared S54, S57 to reference data in distinct clusters of reference data previously obtained for said given VM. In particular, the clusters may comprise: a cluster of normal data, the later indicative of a statistically normal behavior of said given VM (to enable the comparison indicated at step S54); and a cluster of outlier data S57, indicative of a statistically abnormal behavior of said given VM (for the comparison of step S54). As explained below in detail, this will allow to distinguish resource contention from a non-contention change, e.g., a mere phase change at said given VM, when establishing the active diagnosis.

As seen in FIG. 1, the isolated data may be first compared S54 with reference data in the cluster of normal data. If the isolated data match reference data in the cluster of normal data, data from the cluster of outlier data may be stored S55 in a history file and flagged as indicative of contention (i.e., the matching outliers are stored together with metadata indicating they are symptomatic of resource contention for said given VM). In other words, if the accumulated data match normal data, then it can be realized that said given VM gets back to a normal behavior once isolated. Thus, one can deduce that said given VM was indeed subject to contention before throttling the neighboring VMs. In such a case, the matching outliers are advantageously stored in the history file and labelled as indicative of resource contention for said given VM. Thus, during a next contention, a passive diagnosis (using the updated history file) would suffice to detect resource contention for this VM, without it being needed to trigger a new active diagnosis.

Note that, at step S54, the isolated data are preferably compared to latest known normal data, in order to account for the temporality of the detected phenomenon. In variants, one may compare the isolation data to a broader set of data, e.g., to all known normal data for the VM at stake. This, however, is computationally more intensive and error prone.

A history file as used herein may be used in the form of an actual file, database or database entries, or, more generally, any appropriate aggregation of data that suits its purpose, i.e., maintaining historic data for later verification operations.

Now, if the isolated data do not match data in the cluster of normal reference data, another comparison may advantageously be performed. Namely, the isolated data may be further compared S57 with data from the cluster of outliers. And if a match is found, one may this time store S58 the isolated data in the history file and flag them as non-contention related. Indeed, if the isolated data match statistical outliers, then one understands that neighboring VMs were actually not responsible for the change of behavior previously detected. The previously observed change was thus not resulting from contention but rather, e.g., from a phase change in activities of the given VM. In such a case too, it is advantageous to store the isolated data and flag them as non-contention related, e.g., as related to a phase change, to ease subsequent passive diagnosis.

The detection and comparison schemes evoked above may use any appropriate metric, as symbolically depicted in the FIGS. 3-4. Appropriate metrics notably include: Instructions committed Per Cycle IPC, Last Level Cache LLC miss per instruction, Disk {read/write} request queuing time, or Network {transmission} queue length in Bytes. In General, any usage-related information pertaining to any shared resource such as evoked earlier could be used as a metric of interest. Note that the two "metric" axes in FIGS. 4-6 refer to two different metrics. FIGS. 4-6 symbolically illustrate clustering performed on two different dimensions only, for the sake of readability. In fact, clustering can be operated on as many dimensions as needed, depending on the number of different metrics used and computational resources. Note, however, that clustering operations are agnostic to the metrics considered, provided the latter are properly normalized.

As evoked earlier, updating the history file after comparing S54, S57 the isolated data to reference data turns out to be advantageous for subsequent passive diagnoses. That is, if a new change is detected S10 in the behavior of data produced by a same VM for which the history filed was updated, and if this change is statistically equivalent to a previously observed change, a next passive diagnosis S40 will likely return a hit at step S46.

Figure 2:
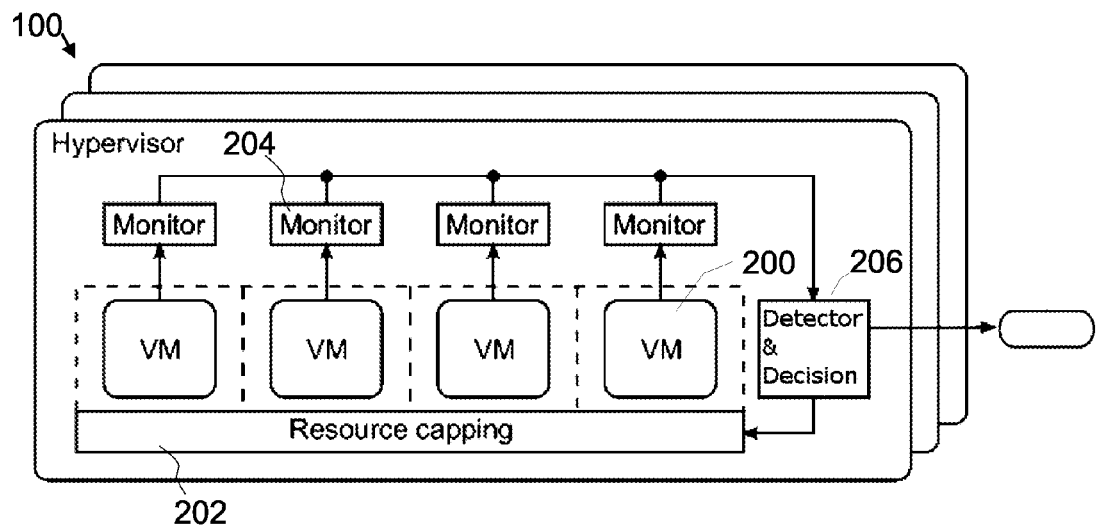
FIG. 2 is a block diagram schematically illustrating selected components of a computerized system according to embodiments.
Figure 7:
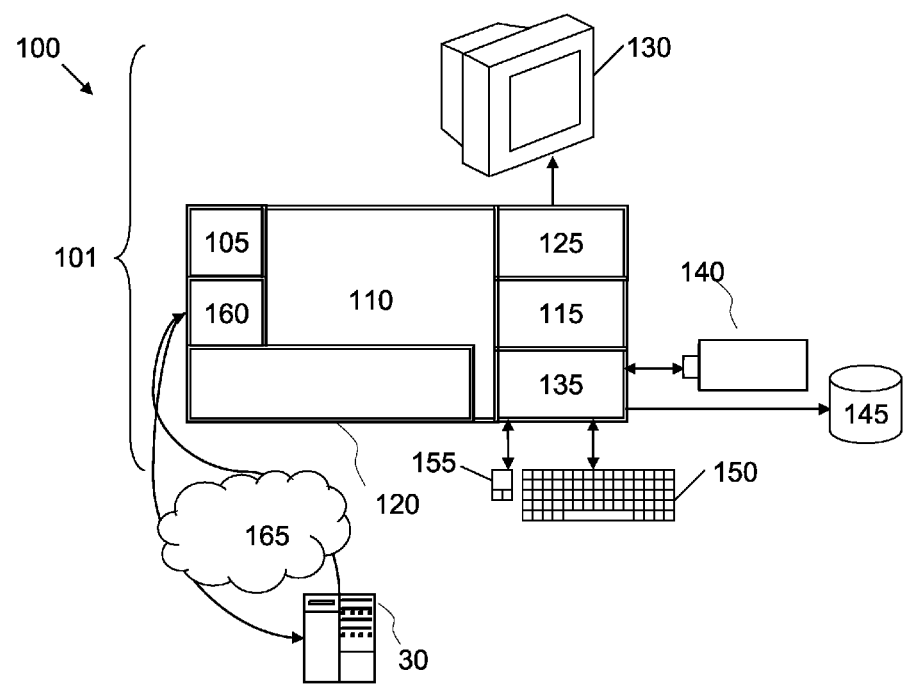
FIG. 7 schematically represents a general purpose computerized system, suited for implementing method steps as involved in embodiments of the invention.

Referring now to FIGS. 2 and 7, according to another aspect, the invention can be embodied as a computerized system 100. The computerized system may advantageously be a cloud server. The system 100 uses collocation of computer processes, e.g., VMs, such that a set of computer processes 200 are co-located thereon. Briefly, the system 100 comprises one or more processing units 105 and a memory 110. The latter typically stored, or is loaded with, computerized methods configured, upon execution by the one or more processing units, for implementing steps of methods as described herein, e.g., the steps depicted in FIG. 1.

In particular, the system 100 may comprise a resource capping unit 202, the latter configured in the system for throttling the co-located VMs 200. The system may also be equipped with independent monitoring units 204, arranged so as to monitor data produced by each VM, independently, and a detection unit 206 for detecting changes in the behavior of data produced by the VMs, as depicted in FIG.

2. The system may further comprise a decision unit 206 coupled to each of the detection unit and the resource capping unit. Using a configuration such as depicted in FIG. 2, the decision unit is able to instruct the resource capping unit 202 to throttle VMs, upon detection of changes in behaviors of data produced by the VMs, so as to detect potential resource contention at the VMs. 17.

The detection and decision units are preferably implemented as a same functional unit 206, as illustrated in FIG. 2. Note, however, that the detector and the decision units do not need to reside on the same physical host as the monitored VMs. They just need to be fed with data produced by the monitors 204 of a specific physical node.

A hypervisor is typically involved, which controls the VMs access to the hardware resources and isolates each VM from the remainder of the system, thereby giving the illusion to a VM that it is running alone on the physical machine (although it is not). The hypervisor notably provides an API, which, for each VM, allows to: (i) monitor its resource usage and (ii) limit its resource allocation/usage. Amongst possible hypervisors are: Linux KVM, Linux Xen and VMware vSphere. Present methods may advantageously uses suitable APIs from the hypervisor used to monitor data and throttle/unleash the VMs.

Next, according to another aspect, the invention can further be embodied as a computer program product for detecting resource contention on a computerized system such as described above. This computer program product comprises computer readable storage medium having program instructions embodied therewith. The program instructions are executable to cause to implement steps of methods described herein. Note that, for completeness, embodiments of the present invention may be implemented as a hardware circuit (e.g., ASIC).

The above embodiments have been succinctly described in reference to the accompanying drawings and may accommodate a number of variants. Examples are given below.

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used.

For instance, the system 100 depicted in FIG. 7 schematically represents a computerized unit 101, e.g., a general-purpose computer. In exemplary embodiments, in terms of hardware architecture, as shown in FIG. 7, the unit 101 includes a processor 105, memory 110 coupled to a memory controller 115, and one or more input and/or output (I/O) devices 140, 145, 150, 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 7, the software in the memory 110 includes methods described herein in accordance with exemplary embodiments and a suitable operating system (OS) 111. The OS 111 essentially controls the execution of other computer programs, such as the methods as described herein (e.g., FIGS. 4-10), and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 140-155 may include other hardware devices.

In addition, the I/O devices 140-155 may further include devices that communicate both inputs and outputs. The system 100 can further include a display controller 125 coupled to a display 130. In exemplary embodiments, the system 100 can further include a network interface or transceiver 160 for coupling to a network 165.

The network 165 transmits and receives data between the unit 101 and external systems. The network 165 is possibly implemented in a wireless fashion, e.g., using wireless protocols and technologies, such as WiFi, WiMax, etc. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 165 can also be an IP-based network for communication between the unit 101 and any external server, client and the like via a broadband connection. In exemplary embodiments, network 165 can be a managed IP network administered by a service provider. Besides, the network 165 can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

The invention claimed is:

1. A method for detecting resource contention on a computerized system that uses collocation of computer processes, the method comprising:
    monitoring data produced by each computer process of a set of computer processes co-located on the computerized system;
    detecting in the monitored data a change in a behavior of data produced by a given computer process of the set of computer processes;
    throttling other computer processes of the set than said given computer process to detect potential resource contention at said given computer process;
    wherein the computerized system uses virtual machines collocation;
    wherein monitoring comprises monitoring data produced by each virtual machine, or VM, of a set of VMs co-located on the computerized system;
    wherein detecting comprises detecting in the monitored data a change in a behavior of data produced by a given VM of the set;
    wherein throttling comprises throttling other VMs of the set than said given VM to detect potential resource contention at said given VM;
    wherein throttling further comprises restricting or shutting down one or more neighboring VMs of the set of VMs that neighbor the given VM; wherein the restricting or shutting down is sufficient to obtain isolative conditions for the given VM, such that the given VM is independently monitored; and
    after detecting the change in the behavior of data produced by the given VM and prior to throttling the other VMs, establishing a passive diagnosis by comparing data produced by the given VM after detecting the change to reference data;
    wherein throttling the one or more other VMs is performed when the passive diagnosis established is inconclusive as to a potential resource contention at said given VM.

2. The method of claim 1, wherein
    the method comprises establishing an active diagnosis as to potential contention at said given VM, wherein establishing the active diagnosis comprises throttling said other VMs to detect potential resource contention at said given VM,
    and wherein,
    establishing the active diagnosis further comprises: accumulating isolated data produced by said given VM when throttling the other VMs; and comparing the isolated data to reference data.

3. The method of claim 2, wherein
    comparing the isolated data comprises comparing the isolated data to reference data previously obtained for said given VM.

4. The method of claim 3, wherein
    comparing the isolated data comprises comparing the isolated data to reference data in distinct clusters of reference data previously obtained for said given VM, the distinct clusters of reference data comprising: a cluster of normal data, indicative of a statistically normal behavior of said given VM, and a cluster of outlier data, indicative of a statistically abnormal behavior of said given VM.

5. The method of claim 4, wherein
    comparing the isolated data further comprises:
        comparing the isolated data with reference data in the cluster of normal data; and
        if the isolated data match said reference data in the cluster of normal data, storing, in a history file, data from the cluster of outlier data together with metadata identifying them as indicative of resource contention for said given VM.

6. The method of claim 5, wherein
    comparing the isolated data further comprises:
        if the isolated data do not match said reference data in the cluster of normal reference data, comparing the isolated data with reference data in the cluster of outlier data; and
        if the isolated data match said reference data in the cluster of outlier data, storing, in the history file, the isolated data together with metadata identifying them as non-contention related.

7. The method of claim 2, wherein
    establishing a diagnosis further comprises, prior to comparing the isolated data to reference data and after accumulating the isolated data, releasing throttling of the other VMs.

8. The method of claim 1, wherein the method further comprises:
    establishing an active diagnosis as to potential contention at said given VM, wherein
        establishing the active diagnosis comprises throttling said other VMs to detect potential resource contention at said given VM,
    and wherein establishing the active diagnosis further comprises:
        accumulating isolated data produced by said given VM when throttling the other VMs;
        comparing the isolated data to reference data; and storing an outcome of comparing the accumulated data to reference data in a history file, and wherein, the method further comprises:

upon detecting a new change in the behavior of data produced by said given VM, establishing a further passive diagnosis by comparing data produced by the given VM after detecting the new change to reference data that comprises the stored outcome.

9. The method of claim 1, wherein monitoring data comprises using a moving average and a standard deviation of data in a temporal window of data produced by each VM of the set of co-located VMs, to detect the change in the behavior of the monitored data.

10. The method of claim 9, wherein a change in the behavior of the monitored data is assumed to be detected if n consecutive statistical outliers are detected for said data in said temporal window, n≥2.

11. The method of claim 1, wherein the computerized system is a cloud server.

12. A computerized system using collocation of computer processes, whereby of a set of computer processes are co-located on the computerized system, the system comprising:

one or more processing units; and a memory comprising computerized methods, the latter configured, upon execution by the one or more processing units, for:

monitoring data produced by each computer process of a set of computer processes co-located on the computerized system;

detecting in the monitored data a change in a behavior of data produced by a given computer process of the set of computer processes;

throttling other computer processes of the set than said given computer process to detect potential resource contention at said given computer process;

wherein the computerized system uses virtual machines collocation;

wherein monitoring comprises monitoring data produced by each virtual machine, or VM, of a set of VMs co-located on the computerized system;

wherein detecting comprises detecting in the monitored data a change in a behavior of data produced by a given VM of the set;

wherein throttling comprises throttling other VMs of the set than said given VM to detect potential resource contention at said given VM;

wherein throttling further comprises restricting or shutting down one or more neighboring VMs of the set of VMs that neighbor the given VM; wherein the restricting or shutting down is sufficient to obtain isolative conditions for the given VM, such that the given VM is independently monitored; and after detecting the change in the behavior of data produced by the given VM and prior to throttling the other VMs, establishing a passive diagnosis by comparing data produced by the given VM after detecting the change to reference data;

wherein throttling the one or more other VMs is performed when the passive diagnosis established is inconclusive as to a potential resource contention at said given VM.

13. The computerized system of claim 12, wherein the system comprises a resource capping unit configured in the system for throttling one or more of the co-located VMs;

a detection unit for monitoring data produced by each VM of the set of VMs and detecting a change in a behavior of data produced by any of the VMs of the set; and a decision unit coupled to the detection unit and the resource capping unit for instructing the resource capping unit, upon detection by the detection unit of a change in a behavior of data produced by said given VM, to throttle said other VMs to detect potential resource contention at said given VM.

14. A computer program product for detecting resource contention on a computerized system using collocation of computer processes, the computer program product comprising a computer readable storage medium having program instructions embodied therewith, the program instructions executable to perform:

monitoring data produced by each computer process of a set of computer processes co-located on the computerized system;

detecting in the monitored data a change in a behavior of data produced by a given computer process of the set of computer processes;

throttling other computer processes of the set than said given computer process to detect potential resource contention at said given computer process;

wherein the computerized system uses virtual machines collocation;

wherein monitoring comprises monitoring data produced by each virtual machine, or VM, of a set of VMs co-located on the computerized system;

wherein detecting comprises detecting in the monitored data a change in a behavior of data produced by a given VM of the set;

wherein throttling comprises throttling other VMs of the set than said given VM to detect potential resource contention at said given VM;

wherein the throttling further comprises restricting or shutting down one or more neighboring VMs of the set of VMs that neighbor the given VM; wherein the restricting or shutting down is sufficient to obtain isolative conditions for the given VM, such that the given VM is independently monitored; and after detecting the change in the behavior of data produced by the given VM and prior to throttling the other VMs, establishing a passive diagnosis by comparing data produced by the given VM after detecting the change to reference data;

wherein throttling the one or more other VMs is performed when the passive diagnosis established is inconclusive as to a potential resource contention at said given VM.

* * * * *